US006166847A

United States Patent [19]

Tench et al.

[11] Patent Number: 6,166,847

[45] Date of Patent: *Dec. 26, 2000

[54] REVERSIBLE ELECTROCHEMICAL MIRROR FOR MODULATION OF REFLECTED RADIATION

[75] Inventors: D. Morgan Tench; Leslie F. Warren, Jr., both of Camarillo; Michael A. Cunningham, Thousand Oaks, all of Calif.

[73] Assignee: Rockwell Technologies, LLC, Thousand Oaks, Calif.

[ * ] Notice: This patent is subject to a terminal disclaimer.

[21] Appl. No.: 09/333,385

[22] Filed: Jun. 15, 1999

Related U.S. Application Data

[63] Continuation-in-part of application No. 08/994,412, Dec. 19, 1997, Pat. No. 5,923,456.

[51] Int. Cl.[7] .............................. G02F 1/155; G02F 1/153

[52] U.S. Cl. .......................... 359/266; 359/265; 359/271; 359/272; 359/275

[58] Field of Search .................................... 359/265, 266, 359/267, 268, 270, 272, 274, 275

[56] References Cited

U.S. PATENT DOCUMENTS

| | | | |
|---|---|---|---|
| 4,768,865 | 9/1988 | Greenberg et al. | 359/266 |
| 4,902,108 | 2/1990 | Byker | 359/265 |
| 5,056,899 | 10/1991 | Warszawski | 359/265 |
| 5,161,048 | 11/1992 | Rukavina | 359/266 |
| 5,210,638 | 5/1993 | Eid et al. | 359/265 |
| 5,239,405 | 8/1993 | Varaprasad et al. | 359/265 |
| 5,293,546 | 3/1994 | Tadros et al. | 359/266 |
| 5,294,376 | 3/1994 | Byker | 359/265 |
| 5,332,530 | 7/1994 | Eid et al. | 359/265 |
| 5,472,643 | 12/1995 | Varaprasad et al. | 359/265 |
| 5,923,456 | 7/1999 | Tench et al. | 359/266 |

FOREIGN PATENT DOCUMENTS

| | | |
|---|---|---|
| 0 618 477 A2 | 10/1994 | European Pat. Off. . |
| 0 652 463 A1 | 5/1995 | European Pat. Off. . |
| 0 712 025 A2 | 5/1996 | European Pat. Off. . |
| 2 504 290 | 10/1982 | France . |
| 328017 | 4/1930 | United Kingdom . |

OTHER PUBLICATIONS

Camlibel, et al., Applied Physics Letters, vol. 33(9), pp. 793–794 (Nov. 1, 1978).

Duchene, et al., IEEE Transactions on Electron Devices, vol. ED–26, No. 8, pp. 1243–1245 (Aug. 1979).

Goldner, Solid State Ionics, vol. 28–30, pp. 1715–1721 (1988).

Howard, et al., Proceedings of Symposium on Electrochemically Deposited Thin Films, San Diego, The Electrochemical Society Proceedings, vol. 93–26, pp. 353–361 (1993).

Howard, et al., Solar Energy Materials and Solar Cells, vol. 39, pp. 309–316 (1995).

Lampert, Circuits and Devices, vol. 8(2), pp. 19–26 (Mar. 1992).

(List continued on next page.)

*Primary Examiner*—Georgia Epps
*Assistant Examiner*—Evelyn A. Lester
*Attorney, Agent, or Firm*—James P. O'Shaughnessey; John J. Deinken

[57] ABSTRACT

An electrochemical mirror includes a transparent first electrode and a second electrode. An electrolytic solution, disposed between the first and second electrodes, contains ions of a metal which can electrodeposit on the electrodes. A negative electrical potential applied to the first electrode causes deposited metal to be dissolved from the second electrode into the electrolytic solution and to be electrodeposited from the solution onto the first electrode, thereby affecting the reflectivity of the mirror for electromagnetic radiation. A surface modification layer applied to the first electrode ensures that the electrodeposit is substantially uniform, resulting in a mirror layer which increases the reflectivity of the mirror. A positive electrical potential applied to the first electrode causes deposited metal to be dissolved from the first electrode and electrodeposited from the solution onto the second electrode, thereby decreasing the reflectivity of the mirror.

39 Claims, 3 Drawing Sheets

OTHER PUBLICATIONS

Mantell, et al., Journal of Electrochemical Society, vol. 109, No. 10, pp. 992–993 (Oct. 1962).

Stocker, et al., Journal of the Electrochemical Society, vol. 128, No. 4, pp. 746–748 (Apr. 1981).

Van Uitert, et al., Applied Physics Letters, vol. 34, No. 3, pp. 232–234 (Feb. 1, 1979).

Zaromb, Journal of the Electrochemical Society, vol. 109, No. 10, pp. 903–912 (Oct. 1962).

Ziegler, et al., Proceedings of Second Symposium on Electrochemically Deposited Thin Films, Miami, The Electrochemical Society Proceedings, vol. 94–31, pp. 23–32 (M. Paunovic, ed. Oct. 1994).

Ziegler, et al., Solar Energy Matrials and Solar Cells, vol. 39, pp. 317–331 (1995).

Zurer, Chemical & Engineering News, p. 10 (Oct. 21, 1996).

Zaromb, Journal of the Electrochemical Society, vol. 109, No. 10, pp. 912–918 (Oct. 1962).

REVERSIBLE ELECTROCHEMICAL MIRROR FOR MODULATION OF REFLECTED RADIATION

CROSS REFERENCE TO RELATED APPLICATIONS

This invention is a continuation-in-part of application Serial Number 08/994,412, filed Dec. 19, 1997, now U.S. Pat. No. 5,923,456.

BACKGROUND OF THE INVENTION

This invention is concerned with devices, such as mirrors and windows, having controllable transmittance and reflectivity.

Sunlight transmitted through windows in buildings and transportation vehicles can generate heat (via the greenhouse effect) that creates an uncomfortable environment and increases air conditioning requirements and costs. Current approaches to providing "smart windows" with adjustable transmission for use in various sunlight conditions involve the use of light absorbing materials. These approaches are only partially effective, since the window itself is heated and because these devices, such as electrochromic devices, are relatively expensive and exhibit limited durability and cycle life. Certain liquid crystal-based window systems switch between transmissive and opaque/scattering states, but these systems require substantial voltages to maintain the transparent state. There is an important need for an inexpensive, durable low voltage smart window with variable reflectivity. Reflecting the light, rather than absorbing it, is the most efficient means for avoiding inside heating.

In prior art attempts to exploit reversible electrodeposition of a metal for light modulation, the deposits obtained on transparent substrates presented a rough and black, gray, or sometimes colored appearance (typical of finely-divided metals) and exhibited poor reflectivity and high light absorbance, especially when thick. This was true in the work of Udaka, for example, even when the transparent conductor electrode surface had been metallized (Udaka, et al., published European Patent Application No. 0712025, Application No. 95 117797.1). Such deposits have been investigated for display applications involving reflectance from the background, with white pigments often being added to improve contrast. Warszawski (U.S. Pat. No. 5,056,899), which is concerned with displays, teaches that reversible metal electrodeposition is most appropriate for display applications, since significant disadvantages for transmission devices were given (e.g., the possibility of metal deposition at the counter electrode). Such teachings imply that the application of reversible metal deposition to smart windows must involve light absorption by the finely divided electrodeposited metal, which would result in heating of the device itself and thus the space inside. The prior art literature also teaches that, for transmission-type devices, reversible metal electrodeposition requires the use of an auxiliary counter electrode reaction; otherwise, metal would plate on the counter electrode as the deposit was de-plated from the working electrode.

Electrolytes described in the prior art literature contain auxiliary redox species (e.g., bromide, iodide, or chloride) that are oxidized (e.g., to bromine, iodine, or chlorine) at the counter electrode during metal deposition, introducing chemistry-related instabilities during long term operation and greatly reducing the memory effect by causing dissolution of the metal deposit on open circuit, e.g., $2Ag^0 + Br_2 \rightarrow 2AgBr$. In most cases, this auxiliary redox process hinders metal deposition at the counter electrode during erasure of the light modulating deposit, introducing a threshold voltage that is desirable for display applications. This auxiliary redox process represents a significant side reaction even when metal plating/deplating occurs at the counter electrode and a threshold voltage is not observed. See, e.g., Warszawski, Columns 3–4 (when copper or nickel were present in the counter electrode paste) and Duchene, et al., Electrolytic Display, IEEE Transactions on Electron Devices, Volume ED-26, Number 8, Pages 1243–1245 (Aug. 1979); French Patent No. 2,504,290 (Oct. 22, 1982). High switching voltages of at least 1 V were used for all the electrodeposition devices which have been found in the patent and literature prior art.

Warszawski teaches that the use of a grid counter electrode would give a less uniform deposit since deposition on the transparent working electrode is highly localized in the vicinity of the counter electrode grid lines (a consequence of the very thin film of gel electrolyte used). Warszawski also teaches the use of an aqueous gel electrolyte to minimize sensitivity to atmospheric contaminants and to avoid the necessity of having a leak tight seal. Such electrolytes, however, have much more limited temperature and voltage operating ranges compared with organic-based electrolytes with high boiling solvents.

Prior art literature teaches that the memory effect is temporary. This is a consequence of the occurrence of a counter electrode reaction other than metal plating/deplating. The energetic oxidation products generated at the counter electrode can cause dissolution of the metal deposit on the working electrode either chemically on open circuit (slow) or electrochemically during short circuit (fast).

None of the reversible electrodeposition devices known in the prior art have exhibited high-reflectivity mirror deposits as needed for applications requiring adjustable reflectivity. Reversible electrodeposition of mirror deposits, for example, could be used to automatically adjust the reflectivity of automotive rear and side view mirrors for optimum viewing under various lighting conditions. In particular, dissolution of some or all of the mirror deposit from a transparent electrode on a glass or plastic substrate could reduce mirror glare from headlights of following vehicles. The reversible electrodeposition approach for adjustable mirrors offers significant cost and safety advantages compared to available electrochromic mirrors, which require a relatively invariant cell gap and involve toxic chemicals (e.g., viologen).

SUMMARY OF THE INVENTION

The electrochemical mirror of this invention permits efficient and precise control over the reflection of visible light and other electromagnetic radiation. The mirror includes a transparent first electrode, a surface modification layer on the first electrode, and a second electrode. An electrolytic solution is disposed between the first and second electrodes such that ions of a metal which can electrodeposit on the first and second electrodes are soluble in the electrolytic solution.

When a negative electrical potential is applied to the first electrode relative to the second electrode, the applied potential tends to cause deposited metal to be dissolved lo from the second electrode into the electrolytic solution and to be electrodeposited from the solution onto the first electrode. The surface modification layer facilitates substantially uniform nucleation of the electrodeposited metal in a mirror surface on the first electrode, such that the amount of deposited metal subsisting on the first electrode affects the reflectivity of the mirror for the radiation. Conversely, when the polarity is reversed and a positive electrical potential is applied to the first electrode relative to the second electrode, the applied potential tends to cause deposited metal to be dissolved from the first electrode and electrodeposited from the solution onto the second electrode, thereby decreasing the reflectivity of the mirror. The reflectivity of the mirror deposit can be selectively adjusted from near 0% to almost 100%, depending on the amount of metal deposited on the conducting film.

In various embodiments, the second electrode may be a continuous or discontinuous electrical conductor. An underlayer may be provided between the second electrode and the second substrate to improve adhesion.

The first electrode may be disposed uniformly on a first substrate, or may be disposed in a pattern. The surface modification layer may be a thin layer (i.e., sufficiently thin to be nominally transparent) of an inert metal which is electrochemically more stable towards oxidation than the electrodeposited metal. The surface modification layer may also be disposed uniformly on the first electrode, or may be disposed in a pattern. An underlayer may be added between the first electrode and the surface modification layer to improve adhesion.

The electrolytic solution may include a gelling agent to form an aqueous or a non-aqueous gel electrolyte.

DESCRIPTION OF THE INVENTION

Figure 1:
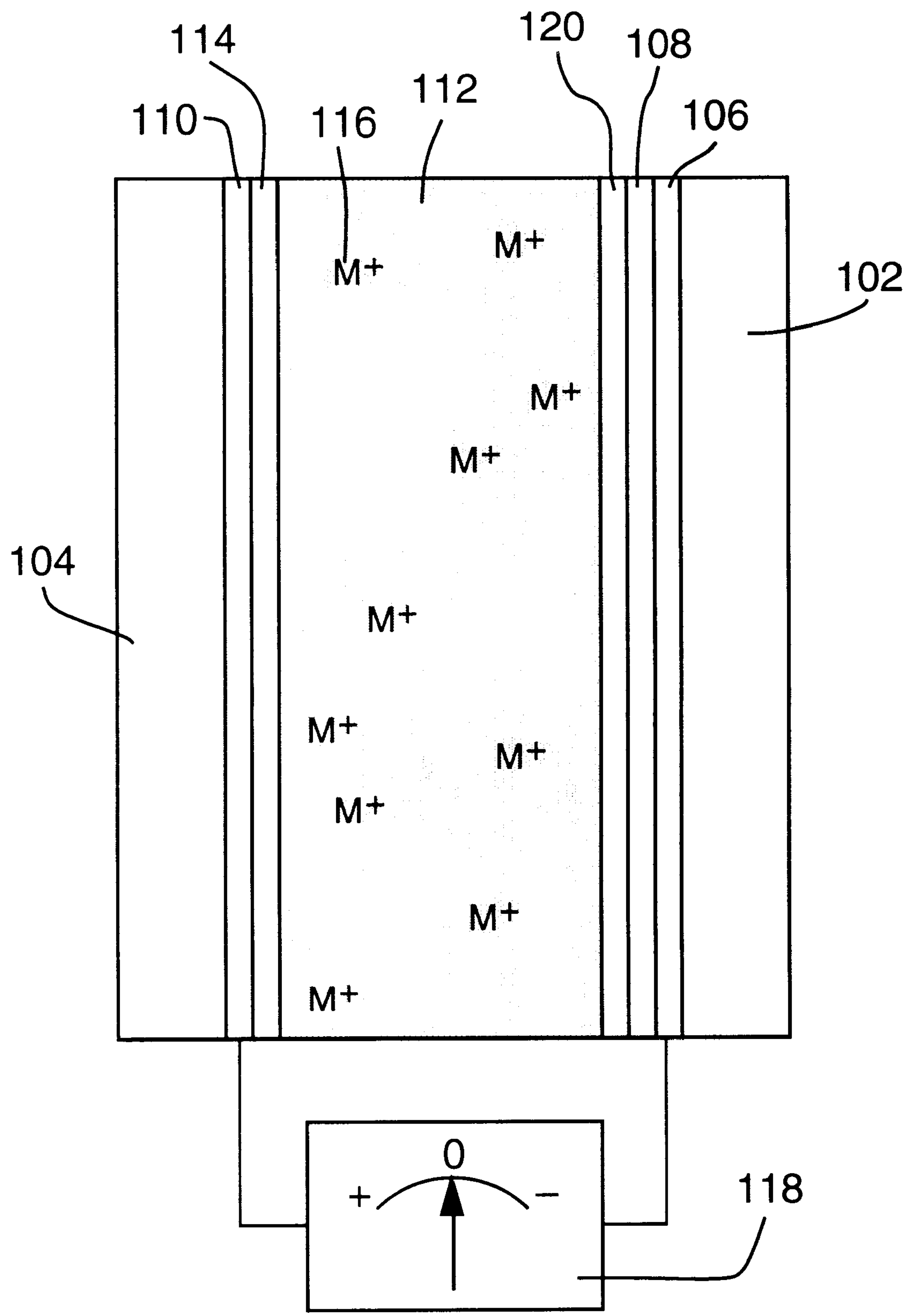
FIG. 1 is a cross sectional view depicting the general design of an electrochemical mirror constructed according to the invention for modulation of reflected radiation.

FIG. 1 is a cross sectional view depicting the general design of an electrochemical mirror constructed according to our invention (some dimensions, particularly layer thicknesses, are disproportionate in the drawings in order to more effectively illustrate the structure and function of the invention). The mirror, which allows precise, reversible control over the reflection of electromagnetic radiation, includes a first substrate 102, which is substantially transparent to the radiation to be controlled, and a second substrate 104. An electrically conducting film 106, which is also substantially transparent, is deposited on the first substrate. The film 106, with the addition of an electrochemically stable surface modification layer 108, functions as a first electrode. A second electrode 110 is deposited on the second substrate 104. The second electrode can alternatively be a bulk electrode, a metal plate or sheet for example, with sufficient rigidity that the second substrate 104 would not be needed. The second electrode 110 is electrochemically stable or is covered with a sufficient thickness of an active metal layer 114 to avoid exposure of the second electrode surface. The surface of electrode 110 may be roughened to reduce reflection of radiation from the electrode or to improve switching speed by lowering the current density.

An electrolytic solution 1112 is located between and in electrical contact with the electrodes 106 and 110. In the configuration depicted by FIG. 1, the mirror may be initially charged by depositing the metallic layer 114 on the electrode 110, i.e., the layer 114 is deposited on the electrode 110 prior to assembly of the mirror. As those skilled in the art will appreciate, and as further explained in the discussion below regarding the operation of the mirror, such a metallic layer may, alternatively, be initially deposited on the electrode 110, on the electrode 106 (i.e., on the surface modification layer 108 as a layer 120), or, as depicted in FIG. 1, divided between a partial deposit on the electrode 106 and a partial deposit on the electrode 110. If the electrode 110 is not itself composed of the mirror metal, the amount of metal in these initially deposited layers constitutes the maximum amount of metal which will be available for deposit, as explained in more detail below, to control the reflectivity of the mirror. Metal ions 116, which contain the same metal atoms as the layers 114 and 120, are dissolved within the electrolytic solution 112 such that the metal atoms in solution can be reversibly electrodeposited on and electrodissolved from the first and second electrodes. The surface modification layer 108 applied to the first electrode 106 facilitates the nucleation on this electrode of electrodeposited metal from the ions 116.

The mirror is intended for use in conjunction with a source of electrical potential 118, which has a reversible polarity and adjustable or pre-set positive and negative potential values, connected between the first and second electrodes 106 and 110. When a negative electrical potential is applied to the first electrode 106 relative to the second electrode 110, metal 114 deposited on the second electrode 110 will tend to be dissolved from the second electrode into the electrolytic solution 112, while metal ions 116 in the solution will tend to be electrodeposited from the solution onto the surface modification layer 108 of the first electrode 106. The surface modification layer 108 will tend to cause the metal to deposit in a substantially uniform layer, forming a mirror surface.

When the polarity of the applied potential is reversed, such that a positive potential is applied to the first electrode 106 relative to the second electrode 110, deposited metal will tend to be dissolved from the first electrode into the solution 112 and dissolved metal will tend to be electrodeposited from the solution onto the second electrode.

The amount of deposited metal which remains on the first electrode will determine the reflectivity which the mirror demonstrates for radiation. The process is reversible and may be maintained at virtually any point between substantially complete deposition on and substantially complete erasure from the first electrode 106. Thus the mirror may be adjusted to any reflective value from approximately 0% reflective to approximately 100% reflective. The lower limit of reflectivity for the mirror is affected by the reflectivities of the nucleation layer 108, the electrode 106, and the substrate 102; these reflectivities may be reduced by use of anti-reflection coatings of the type commonly employed, or by adjusting the layer thicknesses.

Figure 2:
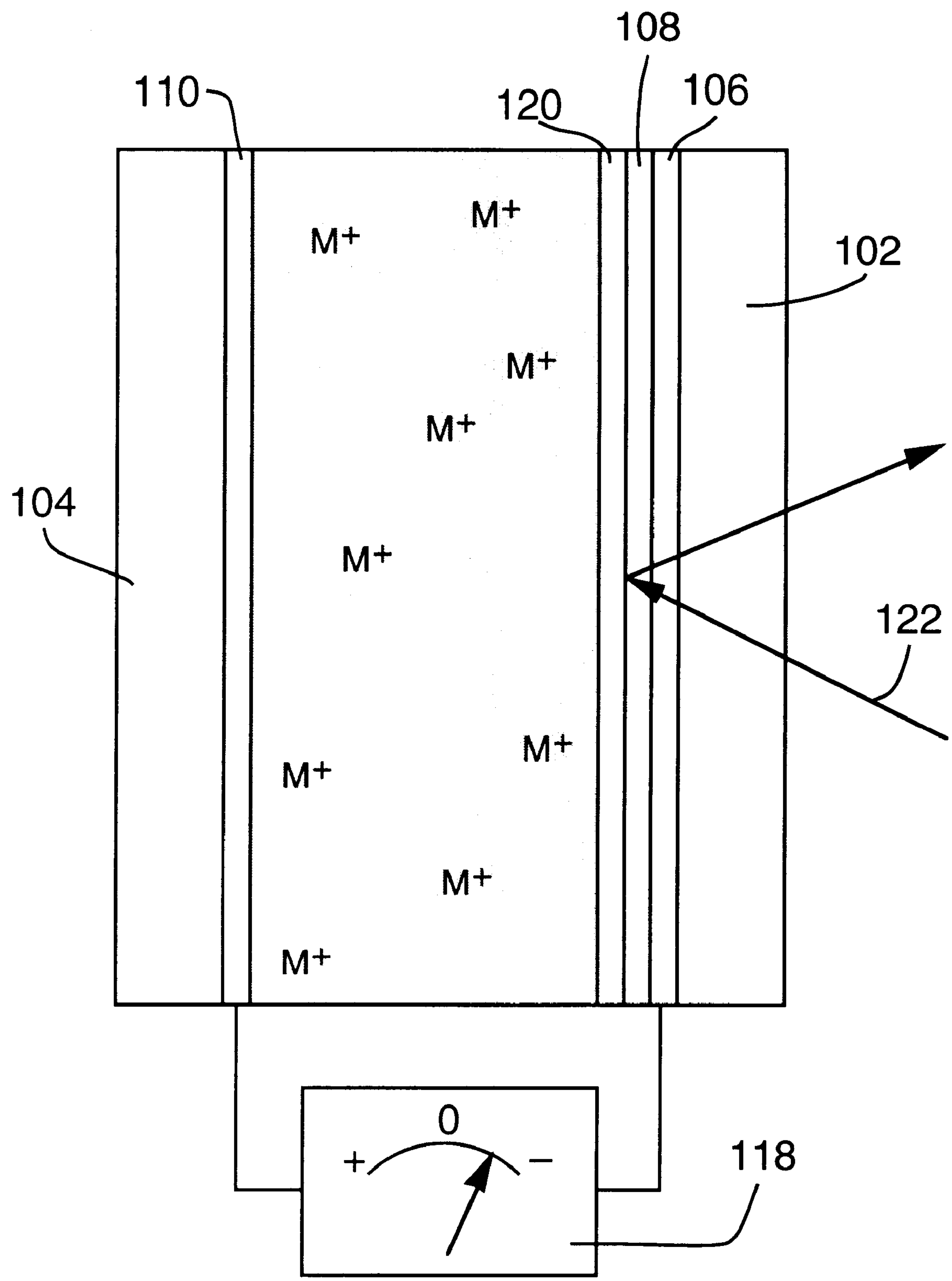
FIG. 2 is a cross sectional view similar to FIG. 1, but illustrating the state of the mirror when sufficient negative electrical potential has been applied to the first electrode relative to the second electrode to cause substantial quantities of the metal to deposit onto the first electrode.

FIG. 2 is a cross sectional view similar to FIG. 1, but illustrating the performance of the mirror when sufficient negative electrical potential has been applied to the first electrode relative to the second electrode for a sufficient period of time to cause a substantial layer of the metal to deposit onto the first electrode. In this condition, the layer 120, created by the deposited metal, will function as a highly reflective mirror and will tend to reflect radiation, illustrated by the light beam 122, which impinges on the mirror.

Figure 3:
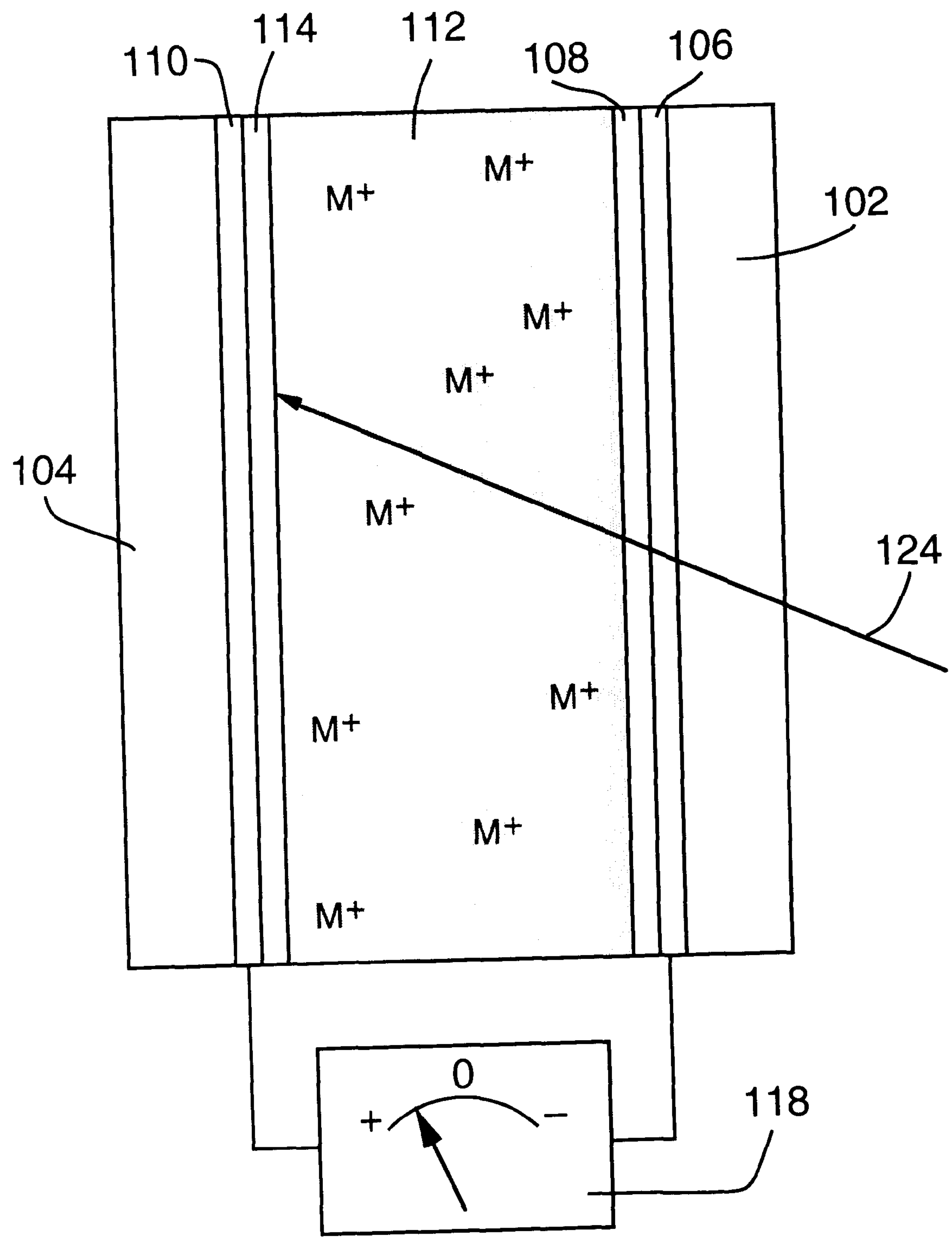
FIG. 3 is a cross sectional view similar to FIGS. 1 and 2, but depicting the state of the mirror when sufficient positive electrical potential has been applied to the first electrode relative to the second electrode to cause substantially all of the metal to deposit on the second electrode.

FIG. 3 is a cross sectional view similar to FIGS. 1 and 2, but illustrating the behavior of the mirror when sufficient positive electrical potential has been applied to the first electrode relative to the second electrode for a sufficient period of time to cause substantially all of the metal to dissolve from the first electrode and to deposit as the metallic layer 114 on the second electrode. In this condition, the mirror will impose a minimal impediment to incoming radiation, thereby allowing substantially all such incoming radiation to be transmitted through the first electrode 106 and surface modification layer 108 and to then be absorbed or dispersed by the electrolyte 112 or the deposited metal 114 on the second electrode 110, as illustrated by the light beam 124. Alternatively, the transmitted light might be absorbed or dispersed by a gel matrix if a gelled electrolyte is employed. An absorbing dye might also be added to the electrolyte or gel matrix to enhance light absorption. For the configuration depicted in FIG. 3, the amount of reflected light will be minimal.

Fabrication of a Preferred Embodiment

The preferred first electrode utilizes a glass or plastic substrate which is uniformly coated on one side with an optically transparent, low resistivity (about 10 Ω/square) ITO (indium tin oxide) or FTO (fluorine-doped tin oxide) film. An adherent inert metal, such as Pt, is vapor deposited, preferably by sputtering, onto the ITO or FTO surface to enhance the rate of nucleation for metal deposition to yield a mirror deposit; other electrochemically inert metals can also be used, e.g., gold, palladium, rhodium, iridium, ruthenium, rhenium, etc. It may be advantageous in some cases to employ a duplex metal film, e.g., Ti/Au or Cr/Au, in which the underlayer metal (e.g., Ti or Cr) serves to improve adhesion of the noble metal to the substrate. An electrical bus connection is formed around the perimeter of the ITO or FTO coating.

For an adjustable reflectivity mirror, the preferred second electrode includes a sheet of the mirror metal (silver, for example) or of another metal, which has been roughened (by bead blasting, for example) to reduce reflection of radiation from the second electrode. When the second electrode is not electrochemically stable under the operating conditions, an excess amount of mirror metal is used so that the second electrode is always covered with the mirror metal and is not exposed to the solution. Alternatively, a protective layer of an electrochemically inert metal, such as platinum, is used between the reactive substrate and the mirror metal. Prior to cell assembly, the second electrode, if other than the mirror metal, is plated with a quantity of mirror metal sufficient to provide the desired amount of reflectivity when deposited on the first electrode and to prevent exposure of the second electrode substrate metal to the electrolyte. (Alternatively, the first electrode can be plated with the mirror metal).

The preferred electrolyte is a gel electrolyte that is both chemically and electrochemically stable except with regard to electrodeposition of the mirror metal. Preferably, the mirror metal is silver added to the electrolyte as a silver halide and stabilized in the electrolyte by addition of an excess of halide ions derived from addition of a halide salt having a cation that is not electroactive (e.g., lithium, sodium or potassium). Other mirror metals having relatively low toxicity and good electrochemical characteristics include copper and bismuth. A mixture of halide ions (chloride, iodide, bromide) may be employed. The solvent is chosen with respect to its freezing and boiling point to provide the desired temperature operating range, as well as good electrolyte stability and good mirror cycling characteristics. Preferred solvents include water, dimethylsulfoxide (DMSO), ethylene glycol, gamma-butyrolactone (GBL), dimethyl formamide (DMF) and mixtures of these. In some cases, it may be necessary to add other species to improve the deposit properties, facilitate electron transfer, or stabilize the mirror metal in the electrolyte. For example, Ag(I) and Cu(I) can also be stabilized by nitrites, amines, phosphines, sulfur donors, etc., e.g. $[Cu(nitrile)_4]CF_3SO_3$. Additives that are electroactive or decomposed during electrodeposition of the mirror metal, such as organic compounds normally used for leveling and brightening electrodeposits, should be avoided since they would limit the mirror cycle life.

Although the mirror of this invention can be fabricated using a liquid electrolyte, use of an electrolyte stiffener is preferred to facilitate mirror fabrication, to minimize electrolyte loss that may affect mirror performance or create a chemical safety hazard, and to adhesively hold glass fragments formed during accidental breakage that could otherwise cause physical personal injury. Preferred electrolyte stiffeners include organic gelling agents, e.g., polyacrylonitrile (PAN), polyvinylalcohol (PVA), polyvinylacetate (PVOAc), and polymethylmethacrylate (PMMA), which dissolve in liquid electrolytes to form transparent plastic-like gels at ambient temperatures. With an appropriate amount of gelling agent, the electrolyte can retain the conductivity of the liquid electrolyte, yet be cut and applied as a "solid state" component. The specific organic polymer gelling agent is chosen based on chemical and electrochemical compatibility with a given electrolyte and metal mirror reaction. Other possible electrolyte stiffeners include porous solid polymers that absorb large quantities of electrolyte, e.g., ormasils and porous polypropylene.

The reversible electrochemical cells of this invention can be fabricated using spacers and a polymer sealant, or using a gasket or o-ring to provide both the proper spacing and a seal. The spacer and seal materials must be chemically compatible with the electrolyte. Good results have been obtained with polypropylene spacers and silicone sealants. The preferred electrode separation is about 0.05–3.0 mm. Electrical contact is made to the metal bus on each electrode and connected to a voltage source for switching.

EXAMPLES

1. An adjustable reflectivity cell having a viewing area of 7.6×12.7 cm was constructed using a mirror electrode comprised of a 30 Å sputtered platinum nucleation layer on 11 ohm/square FTO film on a glass substrate. The counter electrode was a 25 μm thick silver foil (99.99% purity) that had been roughened by bead blasting (170 grit) and was mechanically supported by a thick plastic backing plate. The electrolyte was 0.15 M AgI+1.8 M LiCl in a DMSO solvent. A silicone gasket provided a seal and an electrode spacing of 2.4 mm. This cell exhibited excellent mirror formation and erasure during deep cycling between −0.5 V (relative to the mirror electrode) for 25 s and +0.25 V for 65 s for 46,000 cycles. Although mirror formation remained practically uniform, redistribution of the counter electrode silver resulting in exposure of the backing plate was eventually observed. Separate experiments showed that exclusion of oxygen from the electrolyte is necessary to avoid chemical dissolution of silver metal that can cause mirror loss on open circuit and possibly contribute to silver metal redistribution.

2. An adjustable reflectivity cell having a viewing area of 7.6×12.7 cm was constructed using a mirror electrode comprised of a 30 Å sputtered platinum nucleation layer on 11 ohm/square FTO film on a glass substrate. The counter electrode was 25 μm thick silver electrodeposited from a commercial plating bath on a copper plate that had been roughened by sanding (400 grit). Cell fabrication procedures and the electrolyte were the same as for Example 1. This cell also exhibited excellent mirror formation and erasure and was cycled between −0.4 V for 25 s and +0.25 V for 65 s for 100,000 cycles without significant degradation in the mirror quality.

Features of the Invention

To attain the uniform metal deposition needed for mirror-like reflectivity, it is generally necessary to treat the transparent conducting film of the first electrode to improve nucleation, e.g., by vapor deposition of a very thin, yet optically transparent (~15–200 Å) "seed" layer of an electrochemically inert metal (e.g., platinum or gold). This seed layer minimizes metal deposition overvoltage and enhances the rate of nucleation so that mirror deposits are obtained. Other surface treatments (e.g., electrodeposition of an inert metal layer) could be used to improve metal nucleation and provide mirror deposits. In order to be effective for producing mirror deposits, the nucleation layer must be microscopically continuous, which may not be the case for some metallization treatments on some transparent conductor substrates. For example, the two-step process commonly used to metallize printed wiring boards prior to copper plating (involving palladium displacement of adsorbed tin ions) may not produce sufficiently continuous films with adequate adhesion. For special effects, e.g., a decorative mirror design, the transparent conductor (e.g., ITO or FTO) and/or the metal nucleation layer can be patterned as desired.

Also useful in attaining a mirror deposit are additives that adsorb on the electrode surface, thereby inhibiting the metal deposition process, and additives that complex the mirror metal ions, thereby raising the overvoltage for metal deposition. Most of the organic addition agents used in the plating industry to brighten and level deposits, however, are electrochemically consumed during the metal deposition process and would be inappropriate.

No chemically reactive species are produced, since the same metal deposition/dissolution reaction occurs at both electrodes. As a result, a particular switched state is maintained indefinitely at open circuit if oxidizing contaminants are excluded from the cell.

The mirror of this invention is an electroreflective device (light reflection changed by application of voltage), rather than an electrochromic device (light absorption changed by applied voltage) as is typical of the devices taught in the prior art.

The electrochemical mirror is operated well within the electrolyte stability region, so that excessive metal plating or deplating is not harmful. In fact, the mirror is self-limiting for the mirror electrode when biased within the voltage stability region, since the current will practically cease when the deposited metal is depleted at that electrode. By limiting the amount of mirror metal deposited on the second electrode prior to cell assembly, overplating of the first electrode under a protracted applied voltage can also be precluded.

No cell separator is required, since the same redox couple (metal deposition/dissolution) involving a solid product is used at both electrodes, so that side reactions are avoided. On the other hand, a porous cell separator, e.g., porous polypropylene, may be used to provide a matrix for containing a liquid electrolyte and to prevent shorting of the two electrodes in the event of extreme flexure of the cell.

A wide temperature operating range is obtained by using electrolytes based on high boiling organic solvents, e.g., dimethylsulfoxide, ethylene glycol, propylene carbonate, sulfolane, γ-butyrolactone, tetraglyme, etc. Use of mixtures of these solvents can extend the temperature range to lower operating temperatures.

Use of a "solid state" gel electrolyte which incorporates an electrochemically inert polymer stiffener facilitates mirror fabrication, minimizes the possibility of chemical or physical personal injury, and reduces sensitivity to cell leakage and atmospheric contamination by preventing convectional transport (diffusion is a very slow process).

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

What is claimed is:

1. An electrochemical mirror for reversibly controlling the reflection of electromagnetic radiation, comprising:

a first electrode which is substantially transparent to the radiation;

a surface modification layer disposed on the first electrode;

a second electrode;

an electrolytic solution disposed between and in electrical contact with the first and second electrodes;

a plurality of ions of a metal capable of electrodeposition on the first and second electrodes, the ions being soluble in the electrolytic solution; and a plurality of atoms of said metal disposed on either the first or the second electrode, such that a negative electrical potential applied to the first electrode relative to the second electrode tends to cause deposited metal to be dissolved from the second electrode into the solution and to be electrodeposited from the solution onto the first electrode, the surface modification layer facilitating substantially uniform nucleation of the electrodeposited metal on the first electrode, and such that a positive electrical potential applied to the first electrode relative to the second electrode tends to cause deposited metal to be dissolved from the first electrode and electrodeposited from the solution onto the second electrode, the amount of deposited metal subsisting on the first electrode affecting the reflectivity of the mirror for the radiation.

2. The mirror of claim 1, further comprising:

a first substrate which is substantially transparent to the radiation, the first electrode being disposed on the first substrate.

3. The mirror of claim 2, further comprising:

a second substrate, the second electrode being deposited on the second substrate.

4. The mirror of claim 2, wherein the second substrate is an electrically insulating substrate and wherein the second electrode is a continuous electrical conductor.

5. The mirror of claim 4, wherein the second electrode is an electrochemically stable metal deposited on the second substrate.

6. The mirror of claim 5, wherein the electrochemically stable metal of the second electrode includes at least one metal selected from the group consisting of Au, Cr, Ir, Ni, Os, Pd, Pt, Re, Rh, Ru and stainless steel.

7. The mirror of claim 3, further comprising an underlayer between the second electrode and the second substrate to improve adhesion between the second electrode and the second substrate.

8. The mirror of claim 7, wherein the underlayer includes at least one metal selected from the group consisting of aluminum, chromium, hafnium, molybdenum, nickel, titanium, tungsten and zirconium.

9. The mirror of claim 1, wherein the second electrode is a solid metallic electrode.

10. The mirror of claim 1, wherein the second electrode includes a roughened surface to reduce reflected radiation from the electrode.

11. The mirror of claim 2, wherein the first electrode is disposed uniformly on the first substrate.

12. The mirror of claim 2, wherein the first electrode is disposed in a pattern on the first substrate.

13. The mirror of claim 2, wherein the first electrode is an electrically conductive oxide coating deposited on the first substrate.

14. The mirror of claim 13, wherein the electrically conductive oxide coating is selected from the group consisting of aluminum (doped) zinc oxide, antimony (doped) tin oxide, fluorine (doped) tin oxide, indium oxide, indium tin oxide, fluorine (doped) indium oxide, aluminum (doped) tin oxide, phosphorus (doped) tin oxide, and indium zinc oxide.

15. The mirror of claim 2, wherein the surface modification layer is a thin layer of an electrochemically inert metal which is electrochemically more stable towards oxidation in the electrolytic solution than the electrodeposited metal.

16. The mirror of claim 15, wherein the inert metal layer includes at least one metal selected from the group consisting of Au, Ir, Os, Pd, Pt, Re, Rh and Ru.

17. The mirror of claim 2, further comprising an underlayer between the first electrode and the surface modification layer to improve adhesion between the first electrode and the surface modification layer.

18. The mirror of claim 17, wherein the underlayer includes at least one metal selected from the group consisting of aluminum, chromium, hafnium, molybdenum, nickel, titanium, tungsten and zirconium.

19. The mirror of claim 3, wherein the first and second substrates are glass.

20. The mirror of claim 3, wherein the first and second substrates are a plastic.

21. The mirror of claim 20, wherein the plastic first and second substrates are selected from the group consisting of acrylics, urethanes, polystyrenes, polycarbonates, styrene-acrylonitrile copolymers, styrene-butadiene copolymers, cellulosics, acrylonitrile-butadiene-styrene, polyvinylchloride, thermoplastic polyesters, polypropylene, nylons, polyester carbonates, ionomers, polyethyleneterephthate, and cyclic olefin copolymers.

22. The mirror of claim 2, wherein the electrolytic solution is a solution containing water.

23. The mirror of claim 22 wherein the electrolytic solution further comprises a gelling agent to form a gel electrolyte.

24. The mirror of claim 23, wherein the gelling agent is selected from the group consisting of gelatin, polyacrylamide, polyacrylates derived from polyacrylic acid, polyvinylalcohol, polyvinylpyrrolidone, cellulose derivatives, polyethylene glycols, polyethylene oxides, pectin, tragacanth, alginates, starches, xanthan gum, guar gum, acacia, bentonite, and cetostearyl alcohol.

25. The mirror of claim 22 wherein the electrolytic solution is contained within a solid matrix.

26. The mirror of claim 25 wherein the solid matrix is selected from the group consisting of finely divided electrically insulating powders, porous polymers, insulating sponges, insulating felts, and ormasils.

27. The mirror of claim 2, wherein the electrolytic solution is a non-aqueous solution.

28. The mirror of claim 27, wherein the electrolytic solution further comprises an electrochemically inert gelling agent to form a non-aqueous gel electrolyte.

29. The mirror of claim 28, wherein the gelling agent is a soluble polymer.

30. The mirror of claim 29, wherein the soluble polymer gelling agent is selected from the group consisting of polyacrylamide, polyacrylic acid, polyacrylonitrile, polycarbonate resin, polymethylmethacrylate, polypropylenecarbonate, polyvinylalcohol, polystyrenes, polyvinylchloride, polyvinylidinefluoride, and polyvinylpyrrolidone.

31. The mirror of claim 27, wherein the electrolytic solution is contained within a solid matrix.

32. The mirror of claim 31 wherein the solid matrix is selected from the group consisting of finely divided electrically insulating powders, porous polymers, insulating sponges, insulating felts, and ormasils.

33. The mirror of claim 2, wherein the metal ions are selected from the group consisting of $Ag^+$, $Bi^{3+,\ Cu+/2+}$, $Cd^{2+}$, $Hg^{2+}$, $In^{3+}$, $Pb^{2+}$, $Sb^{3+}$, $Tl^{+/3+}$, $Sn^{2+/4+}$, and $Zn^{2+}$.

34. The mirror of claim 2, wherein the electrolytic solution includes at least one solvent selected from the group consisting of benzonitrile, dimethylcarbonate, dimethylsulfoxide, ethylene carbonate, ethylene glycol, γ-butyrolactone, glycerol, propylene carbonate, sulfolane, tetraglyme, dimethylformamide, and water.

35. The mirror of claim 2, wherein the electrolytic solution further comprises a complexing species for chemically stabilizing the electrodepositable metal ion in solution, thereby facilitating the electrodeposition of a substantially uniform layer of the metal on the first electrode and the dissolution of that layer.

36. The mirror of claim 35, wherein the complexing species is selected from the group consisting of aromatic and olefinic compounds, aromatic nitrites, benzonitrile, aromatic heterocyclic amines, aromatic heterocyclic sulfides, quinoline, sulfides, aliphatic amines, aromatic amines, organo-nitriles, organo-phosphines, organo-thiols, organo-sulfides, halide ions, polyhydric alcohols, succinimide, and pseudohalides (cyanide ion and thiocyanate ion).

37. An electrochemical mirror for reversibly controlling the reflection of electromagnetic radiation, comprising:

- a first substrate which is substantially transparent to the radiation;
- a first electrode which is disposed on the first substrate and which is substantially transparent to the radiation;
- a surface modification layer disposed on the first electrode;
- a second substrate;
- a second electrode which is disposed on the second substrate;
- an electrolytic solution disposed between and in electrical contact with the first and second electrodes;
- a plurality of ions of a metal capable of electrodeposition on the first and second electrodes, the ions being soluble in the electrolytic solution; and a plurality of atoms of said metal disposed on either the first or the second electrode, such that a negative electrical potential applied to the first electrode relative to the second electrode tends to cause deposited metal to be dissolved from the second electrode into the solution and to be electrodeposited from the solution onto the first electrode, the surface modification layer facilitating substantially uniform nucleation of the electrodeposited metal on the first electrode, and such that a positive electrical potential applied to the first electrode relative to the second electrode tends to cause deposited metal to be dissolved from the first electrode and electrodeposited from the solution onto the second electrode, the amount of deposited metal subsisting on the first electrode affecting the reflectivity of the mirror for the radiation.

38. An electrochemical mirror for reversibly controlling the reflection of electromagnetic radiation, comprising:

a first substrate which is substantially transparent to the radiation;

a first electrode which is disposed on the first substrate and which is substantially transparent to the radiation;

a surface modification layer disposed on the first electrode;

a second, electrically insulating substrate;

a second, continuously electrically conducting electrode disposed on the second substrate;

an electrolytic solution disposed between and in electrical contact with the first and second electrodes;

a plurality of ions of a metal capable of electrodeposition on the first and second electrodes, the ions being soluble in the electrolytic solution; and a plurality of atoms of said metal disposed on either the first or the second electrode, such that a negative electrical potential applied to the first electrode relative to the second electrode tends to cause deposited metal to be dissolved from the second electrode into the solution and to be electrodeposited from the solution onto the first electrode, the surface modification layer facilitating substantially uniform nucleation of the electrodeposited metal on the first electrode, and such that a positive electrical potential applied to the first electrode relative to the second electrode tends to cause deposited metal to be dissolved from the first electrode and electrodeposited from the solution onto the second electrode, the amount of deposited metal subsisting on the first electrode affecting the reflectivity of the mirror for the radiation.

39. An electrochemical mirror for reversibly controlling the reflection of electromagnetic radiation, comprising:

a first substrate which is substantially transparent to the radiation;

a first electrode which is disposed on the first substrate and which is substantially transparent to the radiation;

a surface modification layer disposed on the first electrode;

a second, electrically insulating substrate;

a second electrode which is an electrochemically stable metal deposited on the second substrate;

an electrolytic solution disposed between and in electrical contact with the first and second electrodes;

a plurality of ions of a metal capable of electrodeposition on the first and second electrodes, the ions being soluble in the electrolytic solution; and a plurality of atoms of said metal disposed on either the first or the second electrode, such that a negative electrical potential applied to the first electrode relative to the second electrode tends to cause deposited metal to be dissolved from the second electrode into the solution and to be electrodeposited from the solution onto the first electrode, the surface modification layer facilitating substantially uniform nucleation of the electrodeposited metal on the first electrode, and such that a positive electrical potential applied to the first electrode relative to the second electrode tends to cause deposited metal to be dissolved from the first electrode and electrodeposited from the solution onto the second electrode, the amount of deposited metal subsisting on the first electrode affecting the reflectivity of the mirror for the radiation.

* * * * *